July 25, 1967   A. L. VERDIER   3,332,630
ROLL-EQUIPPED MACHINES, IN PARTICULAR GRINDERS AND CALENDERS
Filed June 19, 1964   5 Sheets-Sheet 1
Fig.: 1
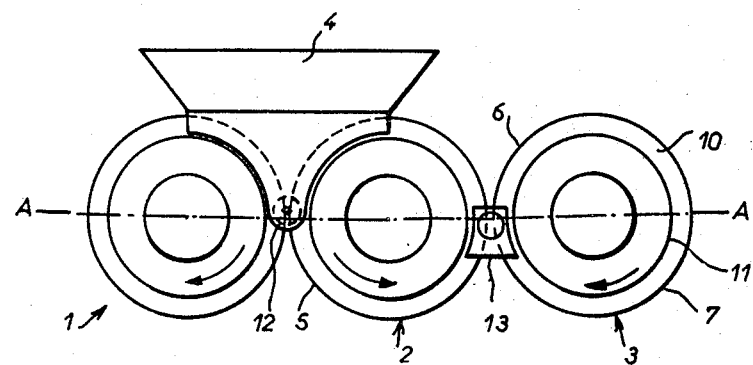
Fig.: 2
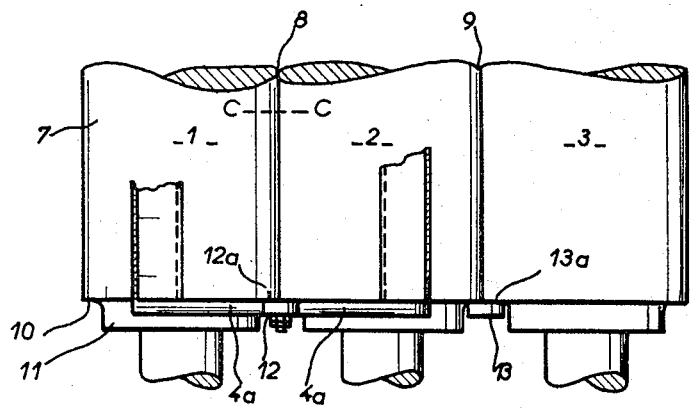
INVENTOR
Andre L. Verdier
By Watson, Cole, Grindle & Watson
ATTORNEYS July 25, 1967     A. L. VERDIER     3,332,630
ROLL-EQUIPPED MACHINES, IN PARTICULAR GRINDERS AND CALENDERS
Filed June 19, 1964     5 Sheets-Sheet 2
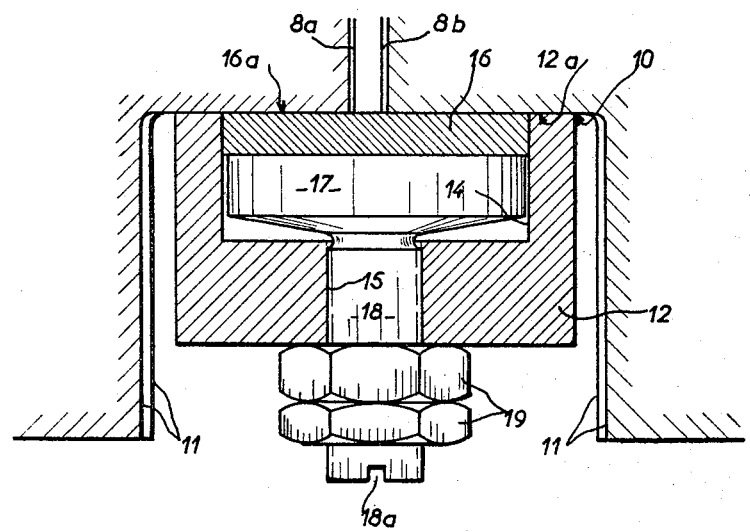
Fig.: 4
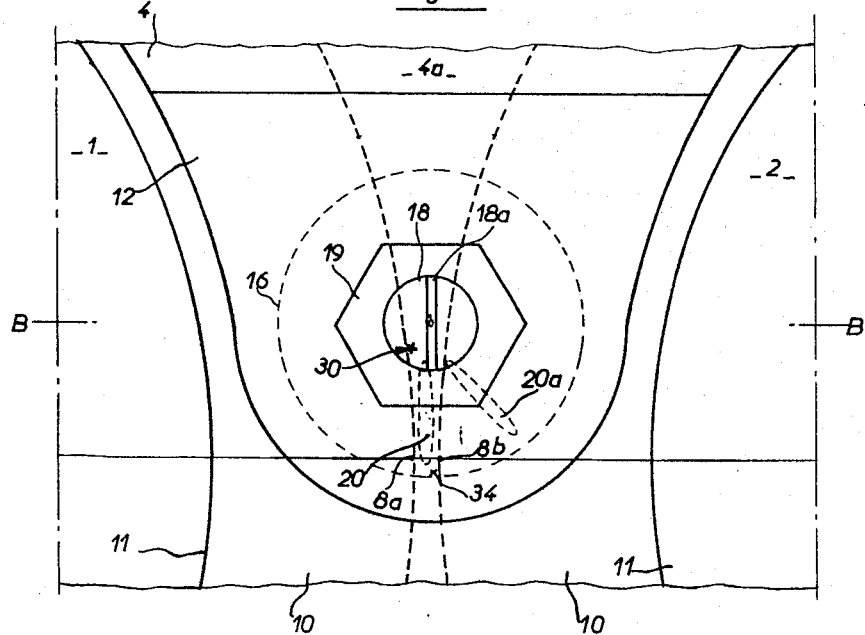
Fig.: 3

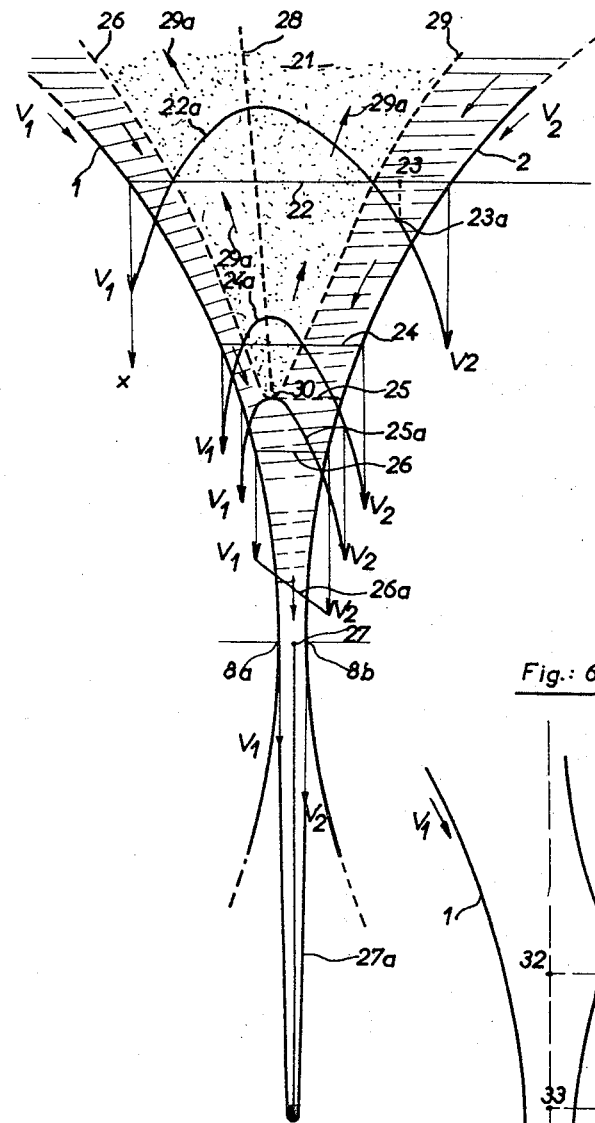
Fig.: 5
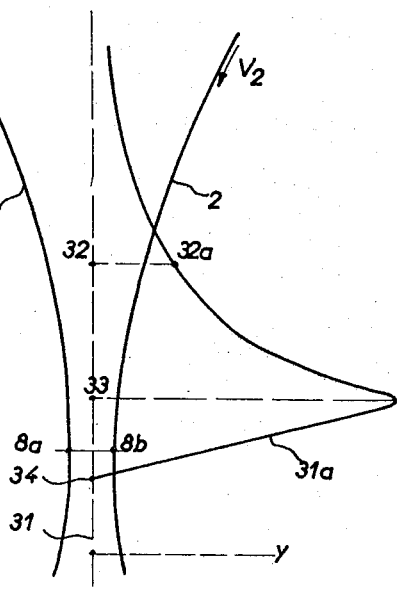
Fig.: 6

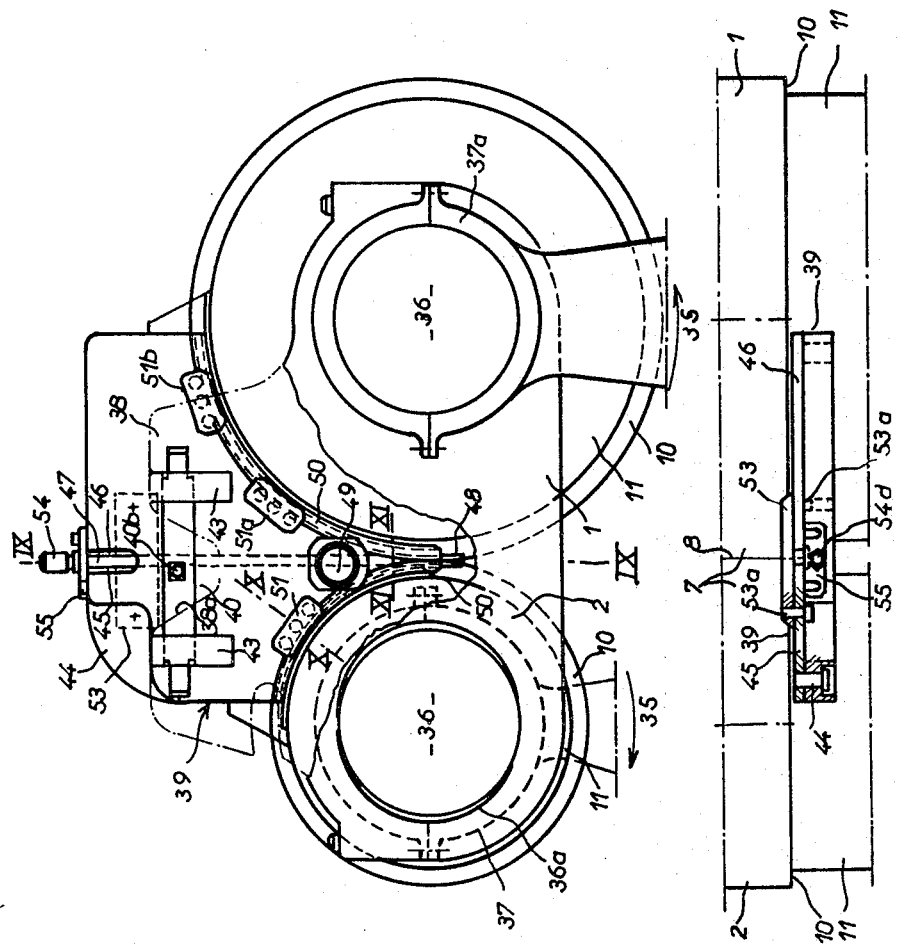

July 25, 1967  A. L. VERDIER  3,332,630
ROLL-EQUIPPED MACHINES, IN PARTICULAR GRINDERS AND CALENDERS
Filed June 19, 1964  5 Sheets-Sheet 5
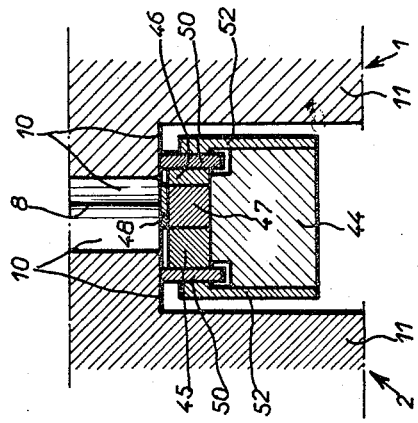
Fig.: 11
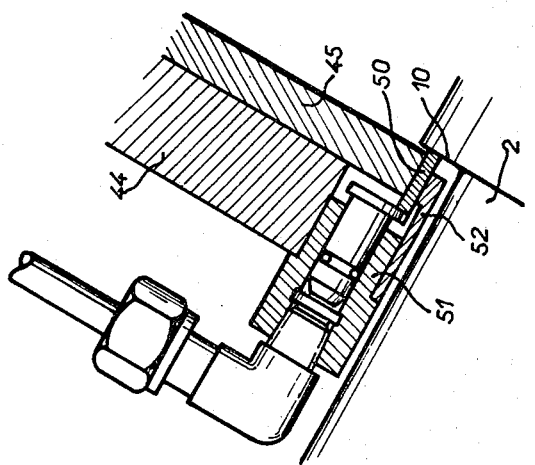
Fig.: 10
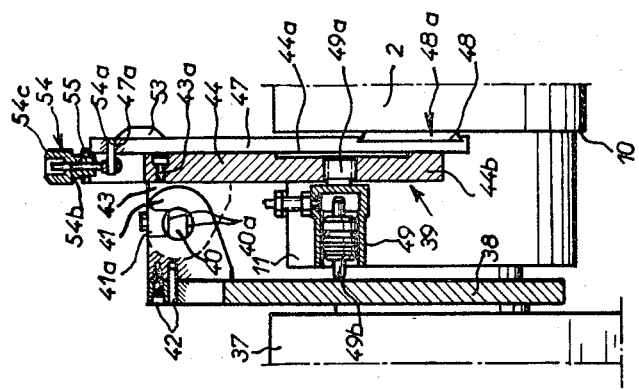
Fig. 9
INVENTOR
Andre L. Verdier
By Watson, Cole, Grindle & Watson
ATTORNEYS

United States Patent Office 3,332,630
Patented July 25, 1967

3,332,630
ROLL-EQUIPPED MACHINES, IN PARTICULAR GRINDERS AND CALENDERS
André Louis Verdier, 6 Ave. Daniel-Lesueur, Paris, France
Filed June 19, 1964, Ser. No. 376,467
Claims priority, application France, June 21, 1963, 939,022
10 Claims. (Cl. 241—159)

The invention relates to working-up machines comprising at least two rotating rolls pressed one against the other and causing materials passing between them to undergo compression. It has for its object to provide improvements which will enable effective working to be obtained over the entire length of the surface of the rolls, that is to say over the entire length of the generatrices which are pressed one against the other.

One group of machines to which the invention is applicable, which will be referred to hereinafter by the name of grinder, serve for dispersion and/or grinding, and more generally for homogenisation of pasty materials, and are used in particular in the chocolate, printing ink, paint, soap, rubber and plastics industries. These grinders sometimes comprise only one pair of rolls but more often the paste passes in succession between a plurality of pairs of rolls, for example first between a first and a second roll and then between the latter and a third roll applied against it on the opposite side to the first roll. Of course, the rolls in contact rotate in opposite directions, so that the paste enters between them and can turn at the same speed. However, in machines referred to as the the "type with rolls having speeds increasing from roll to roll," the first roll rotates less quickly and the third roll more quickly than the middle roll, so that the paste which is passed between the first and the second rolls adheres mainly to the latter by reason of its greater speed and then is introduced and passes between it and the third roll and then adheres mainly to the latter by reason of its even greater speed. In some grinders, and in particular in certain grinders used for the manufacture of chocolate, a fourth roll bearing against the third is provided, and then a fifth roll bearing against the fourth, and so on, the successive rolls rotating faster and faster so that the paste follows a winding path and is compressed in succession between the rolls which are in contact.

The paste to be worked is generally composed of a mixture of more or less liquid products and of solids in the finely divided state, with a varying grain size which may range, for example, from a few millimicrons in the case of the carbon black used in printing inks to several millimetres, it being possible, moreover, for the grains to be collected together to a greater or lesser extent in the form of lumps or clots. The grinder serves to work the paste, and, according to the circumstances, this working may be, for example, kneading, wetting, dispersion, homogenisation, grinding or milling, or a combination of these operations. In all cases, the paste is worked by compression as it passes between the rolls.

When the paste is introduced between two rolls, it passes into an orifice of decreasing rectangular cross-section having a length equal to that of the rolls and a width which decreases as the paste draws nearer to the line of contact of the rolls and the ends of which, if they are not correctly sealed, are at atmospheric pressure. The compression which the paste undergoes as it passes into this orifice is therefore less powerful at the ends than in the centre: it begins to decrease at a certain distance from the ends of the rolls and tends to decrease to atmospheric pressure. The result is that the paste is worked up to a lesser degree at the ends than in the centre, the coarsest particles being recovered at the ends of the rolls.

The same phenomenon occurs in machines serving to grind or mill pulverulent materials, the flow of which between the rolls is analogous to that of a liquid or a paste. The coarsest grains have a tendency to pass to the ends, where they undergo a lesser compression than in the centre.

Another group of machines, which are called calenders or rolling mills, serve to work a product which is in sheet form or to form a sheet starting from a material or mixture of pasty consistency. Such machines are used, for example, in the rubber and plastics industries. The paste is introduced between the rolls, where it is worked by compression, and the sheet is collected on leaving the machine. Here again, the compression undergone by the paste, or by the sheet while it is still very flexible and in a state in which it is capable of flow, falls gradually starting from a certain distance from the ends of the rolls, to drop to atmospheric pressure at the ends. This renders it impossible to obtain a sheet having the same characteristics over the entire length of the rolls.

In machines in existence at the present time, a sheet is formed having a width which is smaller than the length of the rolls and a strip of a certain width is then cut from each side thereof so as to leave only the central portion of the sheet, which has a substantially regular characteristic.

The machines which have been described briefly above, that is to say, machines of the grinder or mill type for working materials in paste form or pulverulent materials, and which may or may not be of the "increasing roll-speed" type, and machines of the calender or rolling mill type for working materials in the form of sheets, are referred to in the remainder of the description and in the claims as "roll-equipped machines of the type described."

According to the present invention, the drawbacks to which attention has been drawn above in roll-equipped machines of the type referred to are eliminated by arranging at all places of contact between rolls, sealing devices which are disposed at the ends of the cooperating rolls, in the vicinity of their facing generatrices, and which separate in tight fashion the space contained between the rolls from the space located at either side thereof. In one constructional form, each of these sealing devices is constituted by an element having a plane surface with a low coefficient of friction, which is mounted outside the rolls in such manner that the said plane surface is applied very precisely against the flanks or ends of the rolls, at the end of their face or working length.

It should be observed that in existing machines, and in particular in grinders, the paste which is introduced between the first two rolls is contained in a hopper, the bottom of which is formed by the rolls themselves and the side walls of which abut against the sides or ends of the said rolls so as to avoid leakages to the outside. However, there is no sealing device at the other places of contact between rolls, for example, in a three-roll grinder, at the place of contact between the middle roll and the third roll.

Moreover, the side walls of the hopper do not ensure true tightness. Even if they are well applied against the flanks of the rolls, it is found that it is not long before deep furrows are formed in the metal opposite the place where the paste flows between the rolls, so that in the vicinity of the ends of the latter the paste prefers to pass through these furrows and this causes the pressure to decrease, as has been explained above.

According to a preferred feature of the invention, a sealing element comprises a removable part or wearing part which can be adjusted so that its surface is disposed exactly in the plane of that of the said element. This part can thus be replaced by another identical part when it has been worn out by the abrasion due to the paste. This part is advantageously adapted to occupy a plurality of positions and disposed in such manner that it is possible, when it is partly worn, to reestablish tightness or the seal by arranging an unworn portion of surface so that it faces the path of the paste.

In one constructional form, this part is a circular disc or a polygonal plate which has merely to be rotated in order to displace the worn portion out of the path of the paste.

It is quite obvious that the friction of the sealing device against the ends of the rotating rolls causes wear and energy losses. It is therefore best to reduce the development of the rubbing surfaces to the minimum. According to a feature of the invention, the useful length of the sealing device, that is to say the length along which the latter actually rubs against the rolls, measured parallel to the movement of the paste, is greater upstream than downstream.

In another constructional form the shifting of the sealing part is effected by translation. Thus, for example, the sealing part may be an elongated part, such as a bar, which is mounted in a support in such manner that it can slide perpendicularly to the line of the centres of the cooperating rolls and which is caused to bear, for example by means of a hydraulic jack, against the side or ends of the said rolls, means being provided for causing this sealing part to slide at will in its support.

The wearing part, which has a plane surface portion facing the flow of the material, is advantageously mounted on a support which also carries sealing elements which cooperate with the ends of the rolls over a certain length of their periphery, the said wearing part and the said sealing elements being made to bear separately against the ends of the roll, preferably by means of a constant hydraulic pressure, in such manner as to ensure a bearing force which is independent of any expansion. This arrangement enables leakages of material to be avoided on either side of the rolls beyond the zone covered by the wearing part, and in particular in the case of a grinder, in that portion of the rolls which enters the feed hopper.

In the case of machines in which the rolls may be staggered, in particular in the case of the machines described in the applicant's U.S. Patent No. 3,066,876 in which the relative height of the bearings of the rolls can be varied, it is necessary to ensure tightness in all the relative positions of the rolls. To this end, it is possible to mount the sealing device on a support which is itself mounted on the bearings. The sealing device, which may or may not comprise a wearing part movable in translation or in rotation, is thus shifted with the bearings, so that the sealing parts are always applied, on either side of the cooperating rolls, against the sides or ends of the latter opposite their facing generatrices.

The description which follows with reference to the accompanying drawings and which is given by way of nonlimitative example, will make the various features of the invention and the method of carrying them into effect clearly understood, any arrangement appearing both from the text and from the drawings coming within the scope of the said invention. In the drawings:

FIGURE 1 shows diagrammatically in elevation a grinder equipped with sealing devices according to the invention;

FIGURE 2 is a diagrammatic view, partly in section, on the broken line A—A in FIGURE 1;

FIGURE 3 is a view on a larger scale of a part of FIGURE 1, showing one constructional form of the sealing device for the first two rolls;

FIGURE 4 is a sectional view on the line B—B of FIGURE 3;

FIGURES 5 and 6 are diagrams showing respectively the distribution of the velocities and the distribution of the pressures in the paste passing between the two rolls, the contour of the latter appearing as seen in section on the line C—C of FIGURE 2, but on a larger scale;

FIGURE 7 is an end view of two rolls of a grinder partly broken away and showing another constructional form of the sealing device;

FIGURE 8 is a plan view of the end of the rolls, showing the sealing device;

FIGURE 9 is a sectional view on the line IX—IX of FIGURE 7;

FIGURES 10 and 11 are views, partly in section, on the lines X—X and XI—XI, respectively, of FIGURE 7, showing details of the sealing device.

The grinder shown in FIGURES 1 and 2 comprises in known manner three rolls 1, 2, 3 pressed one against the other and rotating in the directions indicated by the arrows at speeds which increase from one roll to the next. The paste contained in the hopper 4 passes between the first two rolls, adheres mainly at 5 to the middle roll 2, passes between the latter and the pickup roll 3, then adheres mainly to the latter at 6 and is thereafter collected, for example by means of a scraper or doctor.

Each of the rolls comprises a working portion or face 7 which is in contact with the face of the adjacent roll along a generatrix 8 or 9, at least when the rolls are at a standstill, that is to say when there is no paste between the rolls. The face 7 terminates at each end at a flank or side 10 which connects with a step 11, that is to say, with a cylindrical or conical portion of smaller diameter.

At each end of the face of the rolls 1 and 2 a sealing element 12 connected to the side wall 4a of the hopper is disposed in the vicinity of the generatrices 8. Another sealing element 13 is disposed at each end of the face of the rolls 2 and 3, in the vicinity of the generatrices 9.

Each of these elements is provided with a strictly plane face 12a or 13a and is mounted on the frame (not shown) of the machine in such manner that this face is kept in contact with the flanks or sides 10 of the two cooperating rolls. Thus, each element 12 or 13 may be pressed against the sides 10 by a hydraulic jack, for example, fixed to the frame of the machine. The seal will be all the better if the surfaces in contact are machined and the greater the precision with which they are mounted. Moreover, the friction between the surfaces 12a and 13a and the surfaces of the sides 10 must be relatively slight so as to permit rotation of the rolls without substantial heating of the sides 10.

The sides 10, for example, will be ground and adjusted exactly in the same plane, the rolls being mounted without lateral play, and, after the surfaces 12a and 13a have been carefully polished, they will be covered, by means of a spraygun for example, with a coating of a material having a low coefficient of friction, such as pulverised polytetrafluoroethylene with a molybdenum bisulphide.

FIGURES 3 and 4 show in detail the arrangement of the sealing element 12. In these figures, the generatrices 8 of the rolls 1 and 2, which are in contact when the rolls are at a standstill, have been shown spaced from one another at 8a and 8b by the passage of the paste.

The element 12 is provided with a bore 14 formed normally to the face 12a and into which there opens a tapped coaxial hole 15. In this bore there is engaged, as a tight friction fit, a disc 16, the outwardly directed face 16a of which is treated to obtain the greatest possible resistance to abrasion. This disc bears against a block 17 sliding in the bore 14 and fast with a threaded stem 18 which is screwed into the tapped hole 15 and is locked by means of two lock nuts 19.

The face 16a of the disc is arranged in the same plane as the face 12a of the element 12 and is applied with the latter against the side 10 of the rolls 1 and 2. When the machine has been operating for a certain time, a vertical furrow 20 (FIGURE 3) appears in the surface 16a, this being hollowed out by the abrasive action of the paste. To reestablish the seal or tightness, the element 12, which is fixed to the frame of the machine by a device (not shown) producing a hydraulic clamping action, as has already been mentioned, is removed and the lock nuts 19 are slackened. The disc 16 is then expelled by screwing the threaded stem 18 in, for example by means of a screwdriver inserted in a slot 18a provided at the end of the stem. The disc 16 is turned through a certain angle to bring the furrow into a position, for example at 20a, where it does not interfere with the seal, the disc 16 is then inserted in the bore 14 again and is adjusted by means of the threaded stem 18 so that its face 16a is in exactly the same plane as the face 12a. Finally, the lock nuts 19 are tightened and the element 12 is replaced.

It will be noted from FIGURE 3 that the centre of the disc 16 must be placed well above the generatrices 8a, 8b and that its bottom edge is located a little below the latter. In fact, it is always in this zone extending from a line located substantially upstream of the generatrices 8a, 8b to a line located a little downstream of the latter that the furrow is formed.

This zone, which is where the seal must be excellent and which must be covered by the removable part of the sealing device (for example by a radius of the disc 16), can be determined by experiment for each type of machine. This zone can also be determined by calculation, starting from the explanation of the phenomenon which will be given with reference to FIGURES 5 and 6, it being understood that this explanation is given only as a scientific hypothesis which in no way restricts the invention.

FIGURE 5 shows the distribution of the velocities calculated within a paste 21 of given characteristics passing between the rolls 1 and 2 when these are rotating respectively at speeds $V_1$ and $V_2$ in the directions indicated by the arrows. The velocity of each point such as 23 of the section 22 is given by the ordinate $x$, whether positive or negative, of the corresponding point 23a of of the curve 22a. The curves of the velocities 24a, 25a, 26a, 27a are plotted in the same way for the sections 24, 25, 26 and 27, this latter being the one passing through the generatrices 8a and 8b.

It will be seen that the velocity at the place of contact with each of the rolls is equal to the peripheral speed $V_1$ or $V_2$ of the latter. Within the paste, the particles on the surface 28, which ends at the section 25, are driven in the direction opposite to that of the rotation of the rolls, as indicated by the arrows; all the particles disposed on the inside of the surface 29 are thus driven upwardly. The velocity is nil at the point 30. Starting from the section 25, all the paste is carried along downwardly and the velocities of the particles increased as far as the section 27. They then decrease very rapidly.

FIGURE 6 shows the distribution of the pressures within the paste. The pressure at each point 32 of the median plane 31 is given by the corresponding ordinate 32a of the curve 31a. It will be seen that the pressure first increases very rapidly, that it passes through a maximum at a point 33 located substantially upstream of the generatrices 8a and 8b and then decreases very rapidly to become zero at a point 34 located at a very small distance downstream of these generatrices.

Thus, in the vicinity of the point 33 there is a zone of the flow where the pressure is very high. In the case of those machines in which the rolls rotate at equal speeds, there is moreover also a zone of the flow, upstream of the closest generatrices of the rolls, where the pressure is very high. It is the difference between this considerable pressure and atmospheric pressure which, in conventional machines which do not comprise an effective sealing device, causes the degree of the dispersion or the cohesion of the particles of the materials treated to decline gradually in the vicinity of the ends of the rolls.

It will be understood that the zone of the sealing devices which is worn by the abrasive action of the paste is that where the paste is subjected to high pressures creases slowly along the flow, then passes more quickly and moves at great speed. The sealing devices must therefore cover the entire zone of the paste extending between the point 30 and section 34.

The point 30 and the section 34 have been shown on a slightly smaller scale in FIGURE 3. It will be seen that the centre of the disc 16 is located a little above the point 30 and its bottom edge is located a little below the section 34.

When the paste is introduced between the rolls 2 and 3 (FIGURES 1 and 2), the general character of the phenomenon is the same, but the pressures and the velocities are different. This phenomenon is manifested by the appearance of a bead or roll of paste on each side of the rolls when there is no sealing device.

The sealing device 13 must therefore cover the entire zone extending between a point located substantially upstream of the generatrices 9, where the velocity is nil, and a section located a little downstream of these generatrices, where the pressure is nil. The device 13 may also comprise a wearing disc similar to the disc 16, the centre of which will be positioned below the zero speed point and the top edge above the zero pressure section, or vice versa if it is preferred to place its centre above the generatrices 9.

FIGURES 7 to 11 show another constructional form of the sealing device. In FIGURES 7 and 8 there will be seen the first two rolls 1, 2 of a grinder, pressed one against the other and rotating in the directions of the arrows 35 so as to entrain a paste which is worked as it passes between them. The shafts 36 of these rolls rotate in bearings 37 and 37a which are mounted on the frame of the machine. It will be seen from FIGURES 7 and 9 that a support 38 designed to receive a sealing device is fixed to the two bearings 37 and 37a; of course, another support 38 is arranged symmetrically on the other side of the machine.

Each of the rolls 1 and 2 comprises a working portion or face 7 which is in contact with the face of the other roll along a generatrix 8, at least when the rolls are at a standstill, that is to say when there is no paste between the rolls. The face terminates at each end at a flank 10 which connects with the reduced portion or step 11.

The sealing device, which is designated as a whole by the reference 39, is suspended by means of a shaft 40 in two slotted bearings 41 which are fixed to the support 38 at 42. The shaft 40 is rotatively mounted in two bearings 43 of the sealing device and comprises, in each of the bearings 41, two flat surfaces 40a, so that by turning this shaft 40 through a quarter turn with respect to the position shown in FIGURE 9 the whole of the sealing device 39 can be removed by passing the said shaft 40 through the slot 41a in the bearings 41.

The rotation of this shaft 40 is controlled by a knob 40b accessible through a notch 38a in the support 38, the contour of the notch 38a being shown in chain-dotted lines in FIGURE 7.

The sealing device 39 comprises a base plate 44 carrying two stainless steel plates 45 and 46 between which there slides vertically a stainless steel bar 47 into which there is fitted a bar 48 of abrasion-resistant material, such as tungsten carbide, which is applied against the flanks 10 of the two facing rolls by means of a hydraulic jack 49. The face 48a of the bar 48 is covered with a coating of pulverised polytetrafluoroethylene with a molybdenum bisulphide, to ensure gentle friction against the flanks 10 of the rolls.

It will be seen in FIGURE 9 that the base plate 44 is suspended from the bearings 43 of the shaft 40 by means of bolts 43a and that the jack 49, which is fixed to the base plate 44 at 49a, rests against the support 38 by means of the rod 49b of its piston. The jack 49 therefore bears on the support 38, which is itself supported on the frame of the machine through the medium of the bearings 37 and 37a, to push the base plate 44 towards the right, the base plate pivoting about the shaft 40. It will also be seen in FIGURE 9 that the base plate 44 comprises a recess 44a behind the bar 47, over the major part of the length of the latter, so that the force of this plate 44 is applied against the bar 47 by a small surface 44b covering a small zone surrounding the facing generatrices 8 of the rolls. The bar 48 is therefore applied fully in plumb against the flanks 10 of the rolls in the zone where tightness must be ensured.

Moreover, sealing strips 50 (FIGURES 7, 10 and 11) are applied by jacks 51, 51a, 51b against the flanks 10 of the rolls between the zone covered by the sealing bar 48 and a region located very much upstream of the generatrices 8 which are in contact, so as to prevent leakages of material above the zone of high pressures and high velocities which is rendered tight by the bar 48. These sealing strips 50 slide between the stainless steel plates 45 or 46 (FIGURE 10) and guides such as 52, which are fast with the base plate 44.

The shape of the base plate 44 and the stainless steel plates 45 and 46 is shown in FIGURE 7 and it will be seen that they are adapted to the contour of the reduced portions or steps 11 of the rolls and cover the flanks 10 of the latter between a point located a little downstream of the generatrices 8 in contact and a region located considerably upstream of these generatrices. The sealing strips 50 are bent in circular arcs following the outer contour of the stainless steel plates 45 and 46. The latter come to an end a little above the generatrices 8 in contact, so that the sealing strips 50 are tangential to the wearing bar 48 at the level of these generatrices and thus effectively prevent leakages.

The jacks 51, 51a, 51b are mounted on the base plate 44 and, as the jack 49 is likewise mounted on this base plate, as has been seen hereinbefore, its piston rod 49b bearing on the support 38 only when the jack is actuated, the whole of the device 39 can be removed in one piece in the manner which has been described above.

The stainless steel bar 47 is mounted with slight frictional engagement between the stainless steel plates 45 and 46 and is held by a small plate 53 which is fixed to the plates 45 and 46 by bolts 53a. The sliding of the bar 47 carrying the sealing bar 48 between the plates 45 and 46 and the plate 53 is controlled by a device 54 comprising a pin 54a fitted into a hole 47a in the bar 47 and fast with a threaded rod 54b which co-operates with a nut 54c journalled in a bearing 55 fixed to the base plate 44. The nut 54c is provided with a hexagonal portion 54d which enables it to be turned and thus enables the sliding of the bar 47 to be controlled, of course when the jack 49 is not actuated.

The jacks 49, 51, 51a and 51b are supplied by an oil circuit (not shown). The oil circuit is of the "dynamic" type, that is to say, it is of the type enabling the jacks to be supplied at constant pressure, so that the latter may exert a bearing force which is independent of any expansion. To use the apparatus, the sealing device being in position as shown in the drawings, the adjusting device 54 is operated so that the lower portion of the bar 48 covers the high-pressure and high-velocity zone which, as has been seen above, begins substantially upstream of the generatrices 8 in contact and ends a very short distance downstream of these generatrices. The jacks 49, 51, 51a and 51b are then actuated so as to apply the bar 48, on the one hand, and the sealing strips 50, on the other hand, against the flanks 10 of the rolls. When the machine has been operating for some time and the seal is not perfect any longer by reason of the furrow hollowed out in the bar 48 by the abrasive action of the material, the jacks are slackened off and the adjusting device 54 is operated so as to cause the bar 48 to descend in order to present an unworn surface portion opposite the high-pressure and high-speed zone.

When the bearings 37 and 37a are turned about the axis of the roll 1 in order to vary the offsetting of the rolls, for example by means of a device as described in the applicant's above-mentioned patent, the support 38 and the whole of the sealing device 39 follow the rotation of the bearings, so that the sealing bar 48 remains applied against the cheek of the flanks 10 of the rolls surrounding the generatrices in contact and the sealing elements 50 also remain applied against the flanks 10.

Of course, the support 38 is mounted on the assembly consisting of the bearings 37 and 37a in such manner that these bearings are not rigidly connected to one another, but can move away from, or closer to, one another so as to permit of adjusting their pressing action on one another. For example, the support 38 may be fixed to the bearing 37a by known means (not shown) and rests behind the bearing 37, which is shown in broken lines in FIGURE 7, the shaft 36 of the roll 2 engaging in a non-circular opening 36a in the support 38.

It is obvious that the constructional forms described are only examples and that they could be modified, in particular by substituting equivalent technical means, without thereby departing from the scope of the invention as defined hereinafter by the claims. In particular, the circular disc 16 of the first constructional form could be replaced by an equivalent member of any other shape having an axis of rotation and the bars 47 and 48 of the second constructional form could be replaced by any other sliding member or any other sliding assembly.

Although the constructional forms described relate more particularly to a grinder, they can obviously be adapted to any roll-equipped machine of the type described. In the case of further pairs of cooperating cylinders of a grinder or a calender, a leakage of materials is not liable to take place outside the area which is covered by the sealing member such as 48, and the sealing strips 50 of the second constructional form can be dispensed with.

What is claimed is:

1. In a roller mill, calender and like roller machine having a frame, a spread of at least three consecutive rollers with parallel axes rotatably fitted on said frame, means for urging said rollers against each other for mutual cooperation along adjacent generatrices thereof, means for positively rotating consecutive rollers in opposite directions, means for feeding material to be treated between a first and a second of said three consecutive rollers whereby said material is driven and compressed therebetween and evolves between a zone of substantially zero speed at a small distance ahead of said adjacent generatrices and a zone of substantially zero pressure at a small distance beyond said generatrices, said material being further driven and compressed by passage between said second and a third of said three consecutive rollers, the improvement comprising oppositely located sealing means in overlapping relation with adjacent plane end surfaces of said first and second consecutive roller, each sealing means comprising a wearing member made of an abrasion-resistant material and being of an elongated form extending perpendicularly to the plane containing said parallel axes of said first and second consecutive rollers, clamping means for resiliently urging said wearing member in contact engagement with said adjacent plane end surfaces, and shifting means adapted to slide the wearing member perpendicularly to said plane, and an additional pair of like oppositely located sealing means in overlapping relation with adjacent plane end surfaces of said second and third consecutive rollers.

2. In a machine as claimed in claim 1, wherein said clamping means comprises a jack bearing to urge the wearing members towards the rollers, and said shifting means comprise a supporting assembly, a mounting member fixed to the wearing member and mounted slidably in said supporting assembly, and control means for sliding said mounting member.

3. Machine as claimed in claim 2, comprising sealing strips mounted on said supporting assembly, and means for causing the sealing strips to bear against the plane end surfaces of the rollers between a sealing region which is covered by the wearing member and regions of said plane end surfaces which are located a substantial distance ahead with respect to the direction of flow of the material between said rollers.

4. Machine according to claim 2, wherein said jack is mounted on the supporting assembly, said supporting assembly comprising means for suspending said supporting assembly removably from the frame.

5. Machine according to claim 3, wherein the sealing strips are mounted on the supporting assembly in such manner that they can slide perpendicularly to the end surfaces of the rollers, and said means for causing said sealing strips to bear against said end surfaces comprise jacks fixed to said supporting assembly.

6. In a roller mill, calender and like roller machine having a frame, a spread of at least three consecutive rollers with parallel axes rotatably fitted on said frame, means for urging said rollers against each other for mutual cooperation along adjacent generatrices thereof, means for positively rotating consecutive rollers in opposite directions, means for feeding material to be treated between a first and a second of said three consecutive rollers whereby said material is driven and compressed therebetween and evolves between a zone of substantially zero speed at a small distance ahead of said adjacent generatrices and a zone of substantially zero pressure at a small distance beyond said generatrices, said material being further driven and compressed by passage between said second and a third of said three consecutive rollers, the improvement comprising a pair of oppositely located sealing means in overlapping relation with adjacent plane end surfaces of said first and second consecutive rollers, each sealing means comprising a sealing plate movable parallel to said axes, each plate having a plane face covering said adjacent end surfaces over a height of approximately twice the distance between said zones, and means for resiliently urging the sealing plate in contact engagement with said roller end surfaces, and an additional pair of like oppositely located sealing means in overlapping relation with adjacent plane end surfaces of said second and third consecutive rollers and having like sealing plates for covering said adjacent plane end surfaces of said second and third consecutive rollers over a like height, said improvement further comprising movable bearing means for each of two consecutive rollers, a movable support for said bearing means, and guide means on said movable support for carrying said sealing plates for relative displacement thereof parallel to said axes, and said urging means including resilient means on said movable support for causing said contact engagement between said sealing plates and said roller end surfaces.

7. In a roller mill, calender and like roller machine having a frame, a spread of at least three consecutive rollers with parallel axes rotatably fitted on said frame, means for urging said rollers against each other for mutual cooperation along adjacent generatrices thereof, means for positively rotating consecutive rollers in opposite directions, means for feeding material to be treated between a first and a second of said three consecutive rollers whereby said material is driven and compressed therebetween and evolves between a zone of substantially zero speed at a small distance ahead of said adjacent generatrices and a zone of substantially zero pressure at a small distance beyond said generatrices, said material being further driven and compressed by passage between said second and a third of said three consecutive rollers, the improvement comprising a pair of oppositely located sealing means in overlapping relation with adjacent plane end surfaces of said first and second consecutive rollers, each sealing means comprising a sealing plate movable parallel to said axes, each plate having a plane face covering said adjacent end surfaces over a height of approximately twice the distance between said zones, and means for resiliently urging the sealing plate in contact engagement with said roller end surfaces, and an additional pair of like oppositely located sealing means in overlapping relation with adjacent plane end surfaces of said second and third consecutive rollers and having like sealing plates for covering said adjacent plane end surfaces of said second and third consecutive rollers over a like height, said improvement further comprising a sealing system forming an extension of each of the oppositely located sealing means in overlapping relation with said adjacent end surfaces of the first and second consecutive rollers, the sealing system comprising a support, sealing elements mounted on said support adjacent the end surfaces of said first and second consecutive rollers and extending over a substantial arcuate length of the periphery thereof, and resilient means on said support for applying said sealing elements individually in contact engagement with said end surfaces of said first and second consecutive rollers.

8. In a roller mill, calender and like roller machine having a frame, a spread of at least three consecutive rollers with parallel axes rotatably fitted on said frame, means for urging said rollers against each other for mutual cooperation along adjacent generatrices thereof, means for positively rotating consecutive rollers in opposite directions, means for feeding material to be treated between a first and a second of said three consecutive rollers whereby said material is driven and compressed therebetween and evolves between a zone of substantially zero speed at a small distance ahead of said adjacent generatrices and a zone of substantially zero pressure at a small distance beyond said generatrices, said material being further driven and compressed by passage between said second and a third of said three consecutive rollers, the improvement comprising a pair of oppositely located sealing means in overlapping relation with adjacent plane end surfaces of said first and second consecutive rollers, each sealing means comprising a sealing plate movable parallel to said axes, each plate having a plane face covering said adjacent end surfaces over a height of approximately twice the distance between said zones, and means for resiliently urging the sealing plate in contact engagement with said roller end surfaces, and an additional pair of like oppositely located sealing means in overlapping relation with adjacent plane end surfaces of said second and third consecutive rollers and having like sealing plates for covering said adjacent plane end surfaces of said second and third consecutive rollers over a like height, said improvement further comprising a supporting member for each sealing plate, said supporting member having a plane face, shifting means for shifting the sealing plate in the supporting member, and adjusting means for locating the plane face of the sealing plate exactly in the plane of the plane face of the supporting member.

9. Machine as claimed in claim 8, wherein said sealing plate is a disc-shaped member having its center at a small distance ahead of said zone of substantially zero speed and its peripheral edge at a small distance beyond said zone of substantially zero pressure, said disc-shaped member being mounted in a seat of corresponding form in said supporting member for shifting movement into and out of said seat by translation parallel to its axis, said disc-shaped member being rotatable to occupy various angular positions therein with respect to said axis, and said adjusting means comprises a screw co-operating with a tapped hole in the supporting member for shifting the disc-shaped member parallel to its axis.

10. Machine as claimed in claim 8, wherein said sealing plate is a disc-shaped member having its peripheral edge at a small distance ahead of said zone of substantially zero speed and its center at a small distance beyond said zone of substantially zero pressure, said disc-shaped member being mounted in a seat of corresponding form in said supporting member for shifting movement into and out of said seat by translation parallel to its axis, said disc-shaped member being rotatable to occupy various angular positions therein with respect to said axis, and said adjusting means comprises a screw cooperating with a tapped hole in the supporting member for shifting the disc-shaped member parallel to its axis.

References Cited

UNITED STATES PATENTS

| | | | |
|---|---|---|---|
| 1,050,183 | 1/1913 | Wall | 241—226 |
| 2,808,215 | 10/1957 | Bosshard | 241—226 |
| 3,066,876 | 12/1962 | Verdier | 241—159 |

FOREIGN PATENTS 161,475   6/1905   Germany.

ANDREW R. JUHASZ, *Primary Examiner.*